(12) United States Patent
Chiu (10) Patent No.: US 10,437,047 B2
(45) Date of Patent: Oct. 8, 2019

(54) VIRTUAL REALITY DISPLAY APPARATUS

(71) Applicant: Acer Incorporated, New Taipei (TW)

(72) Inventor: Yi-Jung Chiu, New Taipei (TW)

(73) Assignee: Acer Incorporated, New Taipei (TW)

( * ) Notice: Subject to any disclaimer, the term of this patent is extended or adjusted under 35 U.S.C. 154(b) by 114 days.

(21) Appl. No.: 15/709,485

(22) Filed: Sep. 20, 2017

(65) Prior Publication Data
US 2018/0224655 A1 Aug. 9, 2018

(30) Foreign Application Priority Data

Feb. 8, 2017 (TW) .............................. 106104059 A (51) Int. Cl.
| | |
|---|---|
| *G02B 26/08* | (2006.01) |
| *H04N 13/00* | (2018.01) |
| *G06T 19/00* | (2011.01) |
| *G02B 3/08* | (2006.01) |
| *G02B 5/00* | (2006.01) |
| *H04N 13/344* | (2018.01) |
| *G02B 27/01* | (2006.01) |

(52) U.S. Cl.
CPC ........... *G02B 26/0875* (2013.01); *G02B 3/08* (2013.01); *G02B 5/003* (2013.01); *G02B 27/0172* (2013.01); *G02B 27/0179* (2013.01); *G06T 19/006* (2013.01); *H04N 13/344* (2018.05); *G02B 2027/012* (2013.01)

(58) Field of Classification Search
CPC ...... G02B 26/0875; G02B 5/003; G02B 3/08; G02B 27/0172; G02B 27/0179; G02B 2027/012; H04N 13/044; H04N 13/344; G06T 19/006

USPC .......................................................... 348/51
See application file for complete search history.

(56) References Cited

U.S. PATENT DOCUMENTS

| | | | |
|---|---|---|---|
| 5,347,400 A | 9/1994 | Hunter | |
| 5,835,458 A * | 11/1998 | Bischel | G11B 7/122 |
| | | | 369/44.12 |
| 9,285,591 B1 | 3/2016 | Gupta et al. | |
| 2002/0094495 A1 * | 7/2002 | Ono | G02B 3/08 |
| | | | 430/321 |
| 2012/0120498 A1 * | 5/2012 | Harrison | G02B 3/08 |
| | | | 359/630 |

(Continued)

FOREIGN PATENT DOCUMENTS

| | | |
|---|---|---|
| JP | 2012022278 | 2/2012 |
| TW | M314335 | 6/2007 |

(Continued)

*Primary Examiner* — Hee-Yong Kim
(74) *Attorney, Agent, or Firm* — JCIPRNET (57) ABSTRACT

A virtual reality display apparatus including at least a display and at least an optical assembly is provided. The display provides an image beam to a user's left eye or right eye. The optical assembly disposed on the transmission path of the image beam includes at least a Fresnel lens. Each of the display and the optical assembly both has a tilt angle relative to an upward direction, wherein the upward direction is the direction perpendicular to the user's horizontal sight line plane and defined as the direction pointing from the user's neck to the top of the user's head, and the tilt angle is within a range greater than 0 degree and is smaller than or equal to 20 degrees.

17 Claims, 5 Drawing Sheets

(56) References Cited

U.S. PATENT DOCUMENTS

2014/0022637 A1    1/2014   Richards et al.
2014/0266990 A1    9/2014   Makino et al.

FOREIGN PATENT DOCUMENTS

| | | |
|---|---|---|
| TW | 201326895 | 7/2013 |
| WO | 2017108211 | 6/2017 |

\* cited by examiner

VIRTUAL REALITY DISPLAY APPARATUS

CROSS-REFERENCE TO RELATED APPLICATION

This application claims the priority benefit of Taiwan application serial no. 106104059, filed on Feb. 8, 2017. The entirety of the above-mentioned patent application is hereby incorporated by reference herein and made a part of this specification.

BACKGROUND

Field of the Invention

The invention is directed to a display apparatus and more particularly, to a virtual reality display apparatus.

Description of Related Art

Along with the progress of display techniques, in order to experience vividly, users are no longer satisfied with watching only two-dimensional (2D) images. In order to provide users with visual entertainment with more senses of reality in three-dimensional (3D) images, virtual reality (VR) becomes a new trend of current display technologies. VR can be applied to simulate a virtual scene of a 3D space to provide users with sensory experience, for example, visual experience, for watching images in a 3D space, or even interact with a virtual image.

A commonly seen virtual reality display apparatus is equipped with a head mounted display (HMD), which can be worn on the user's head, but usually has a disadvantage of insufficient vertical view angle. This is because view angles of human eyes are not vertically symmetric. A human eye has a lower view angle of about 70 degrees, which is greater than the upper view angle with a range of about 50 degrees. However, in currently available products, the upper and the lower fields of view are usually designed with the same range. As a result, an issue that a black border often appears in a lower part of the field of view arises. In addition, most virtual reality display apparatuses, with a fixed distance between optical assemblies thereof and a non-adjustable focal length, cannot be suitable for all people to watch. Users with myopia or hyperopia still have to wear glasses or contact lenses for vision correction to clearly view the images presented in front of the eyes. Moreover, in a virtual reality display apparatus, the optical assembly uses a Fresnel lens in replacement with a conventional lens for reducing the weight and volume of the optical assembly. However, a surface of the Fresnel lens is sawtooth-shaped, in which one side of side surfaces is an effective area for optical imaging, and the other side is a non-optical effective area for convenience of de-molding. When light irradiates the non-optical effective area, stray light occurs, and this results in reduction of viewing quality.

SUMMARY

The invention provides a virtual reality display apparatus capable of effectively expanding a user's vertical field of view.

The invention provides a virtual reality display apparatus capable of improving the issue of stray light.

According to an embodiment of the invention, a virtual reality display apparatus including at least one display and at least one optical assembly is provided. The display is configured to provide an image beam to a user's left eye or right eye. The optical assembly is disposed on a transmission path of the image beam and includes at least one Fresnel lens. Each of the display and the optical assembly has a tilt angle relative to an upward direction. The upward direction is a direction perpendicular to the user's horizontal sight line plane and defined as a direction pointing from the user's neck to the top of the user's head, and a range of the tilt angle is greater than 0 degree and is smaller than or equal to 20 degrees.

According to an embodiment of the invention, a virtual reality display apparatus including at least one display and at least one optical assembly is provided. The display is configured to provide an image beam to a user's left eye or right eye. The optical assembly is disposed on a transmission path of the image beam and includes at least one Fresnel lens, wherein a non-optical effective area of the Fresnel lens is coated with a light absorbing material.

Based on the above, the virtual reality display apparatus provided by the embodiments of the invention includes at least one display and at least one optical assembly including at least one Fresnel lens. Each of the display and the optical assembly has the tilt angle relative to the upward direction, the range of the tilt angle is greater than 0 degree and is smaller than or equal to 20 degrees, and thereby, the user's vertical field of view can be expanded. The virtual reality display apparatus provided by another embodiment of the invention includes at least one display and at least one optical assembly including at least one Fresnel lens having the non-optical effective area coated with the light absorbing material. With the non-optical effective area of the Fresnel lens which is coated with the light absorbing material, the light can be blocked from passing through the optical assembly from the non-optical effective area, so as to improve the issue of stray light to enhance viewing quality of the virtual reality.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1A:
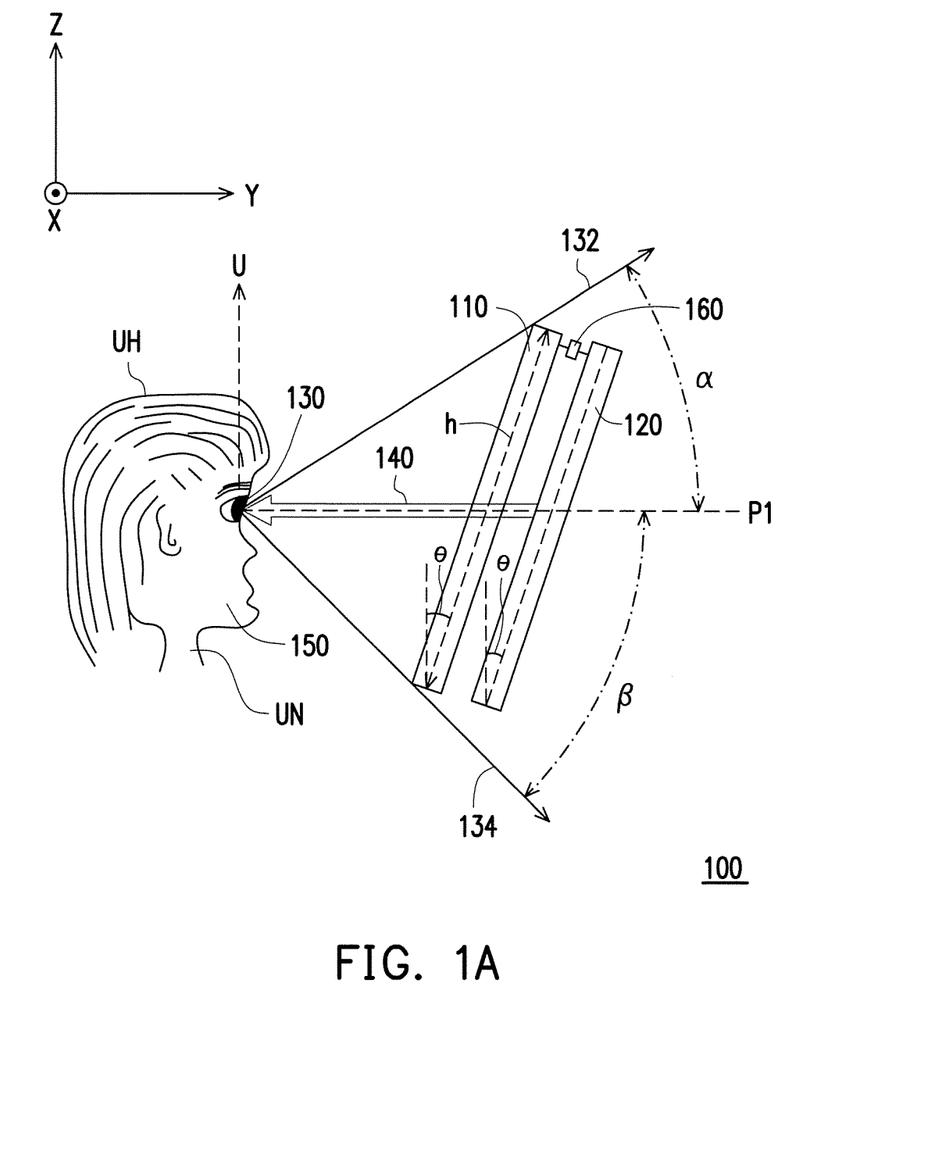
FIG. 1A is a schematic side view of a virtual reality display apparatus according to an embodiment of the invention.
Figure 1B:
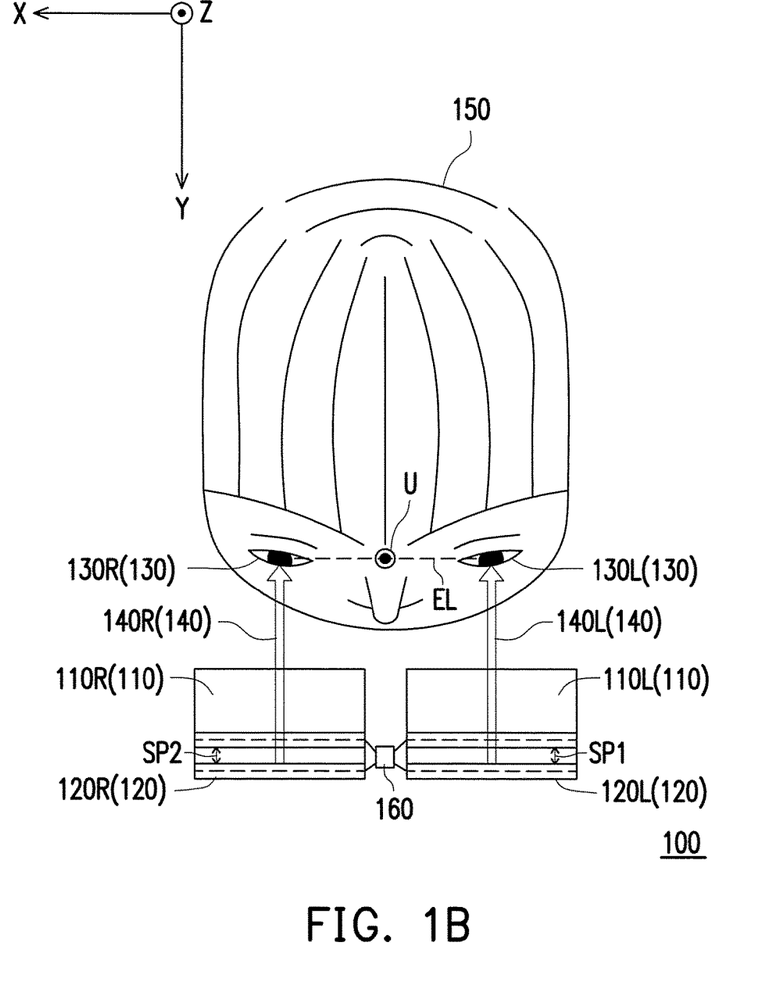
FIG. 1B is a schematic top view of the virtual reality display apparatus of the embodiment depicted in FIG. 1A.

FIG. 1A is a schematic side view of a virtual reality display apparatus according to an embodiment of the invention. FIG. 1B is a schematic top view of the virtual reality display apparatus of the embodiment depicted in FIG. 1A. Referring to FIG. 1A and FIG. 1B, a virtual reality display apparatus 100 of the present embodiment includes at least one optical assembly 110 and at least one display 120 (for example, FIG. 1B illustrates two optical assemblies 110R and 110L and two displays 120R and 120L), and the virtual reality display apparatus 100 may be suitable for a head mounted device (HMD). The displays 120 are configured to provide image beams 140 to a user's eyes 130 for the user to view a virtual image, for example, a three-dimensional (3D) virtual image. The displays 120 may be two displays respectively to be viewed by the user's left and right eyes. In the present embodiment, the displays 120 include the display 120R and the display 120L. The optical assemblies 110 are disposed on transmission paths of the image beams 140 and include optical assemblies 110R and 110L. The display 120R provides an image beam 140R to the user's right eye 130R, and the display 120L provides an image beam 140L to the user's left eye 130L. The optical assembly 110R is located on a transmission path of the image beam 140R to the user's right eye 130R, and the optical assembly 110L is located on a transmission path of the image beam 140L to the user's left eye 130L.

The display is, for example, a liquid crystal display (LCD), an organic light-emitting diode (OLED) display, a flexible type display or other displays, which is configured to provide left-eye or right-eye image frames.

In the present embodiment, referring to FIG. 1B, a user's horizontal sight line plane P1 is a plane including a connection line EL (e.g., along the X-axial direction) connecting user's two eyes and sight lines when the two eyes horizontally view forward. For example, when the user stands perpendicularly on the ground, the horizontal sight line plane P1 is in front of the user and parallel to the ground. When the user lies down, i.e., in a direction parallel to the ground, the sight lines of the two eyes are in a direction pointing toward the sky while the horizontal sight line plane P1 in this case is a plane perpendicular to the ground. The user's horizontal sight line plane P1 is determined relatively according to a position of the user's head 150. For example, in FIG. 1A, the user's horizontal sight line plane P1 is parallel to the XY plane. Additionally, an upward direction U is a direction perpendicular to the user's horizontal sight line plane P1 and defined as a direction pointing from the user's neck UN to the top of the user's head UH. For example, in FIG. 1A, the upward direction U is the Z-axial direction.

In the present embodiment, in FIG. 1A, each of the optical assembly 110 and the display 120 clockwise deflects by, for example, a tilt angle θ relative to the upward direction U (i.e., the Z-axial direction). Namely, lower ends of the optical assembly 110 and the display 120 deflect in a direction adjacent to the user, and upper ends of the optical assembly 110 and the display 120 deflect in a direction away from the user. Thus, the optical assembly 110 and the display 120 have the same tilt angle θ respectively relative to the upward direction U, where the tilt angle θ is an acute angle. In this case, the upper and the lower ends of the optical assembly 110 and the display 120 are described with respect to the upward direction U. However, in other embodiments, the optical assembly 110 and the display 120 may also have different tilt angles relative to the upward direction U. For example, when the tilt angle θ is 0 degree, the optical assembly 110 and the display 120 are just right perpendicular to horizontal sight line plane P1.

The user's sight line 132 refers to a sight line along which the user is capable of seeing the top of the optical assembly 110, and the user's sight line 134 refers to a sight line along which the user is capable of seeing the bottom of the optical assembly 110. It should be specially mentioned that "upper" and "lower" as referred to herein are described with respect to the upward direction U. An included angle formed by the user's sight line 132 and the horizontal sight line plane P1 is referred to as an upper field of view α, and an included angle formed by the user's sight line 134 and the horizontal sight line plane P1 is referred to as a lower field of view β. For instance, when a distance from the optical assembly 110 to the user's eyes 130 is approximately 13 mm, a height h of the optical assembly 110 is 60 mm, a geometric center of the optical assembly 110 is on the horizontal sight line plane P1, and the tilt angle θ is equal to 20 degrees, the user's upper field of view α in this case is approximately 50.47 degrees, which is close to a threshold value of an upper view angle of human eyes. The height h is a width of the optical assembly 110 which is adjacent to the upward direction U and perpendicular to an optical axis of the optical assembly 110.

Sizes of the user's upper field of view α and the lower field of view β may be adjusted according to the size of the tilt angle θ. In the present embodiment, a range of the tilt angle θ may be greater than 0 degree and be smaller than or equal to 20 degrees.

In brief, since the display 120 and the optical assembly 110 respectively have the tilt angle θ relative to the upward direction U, and the range of the tilt angle θ is greater than 0 degree and is smaller than or equal to 20 degrees, the user's vertical field of view may be expanded in this way.

Figure 2A:
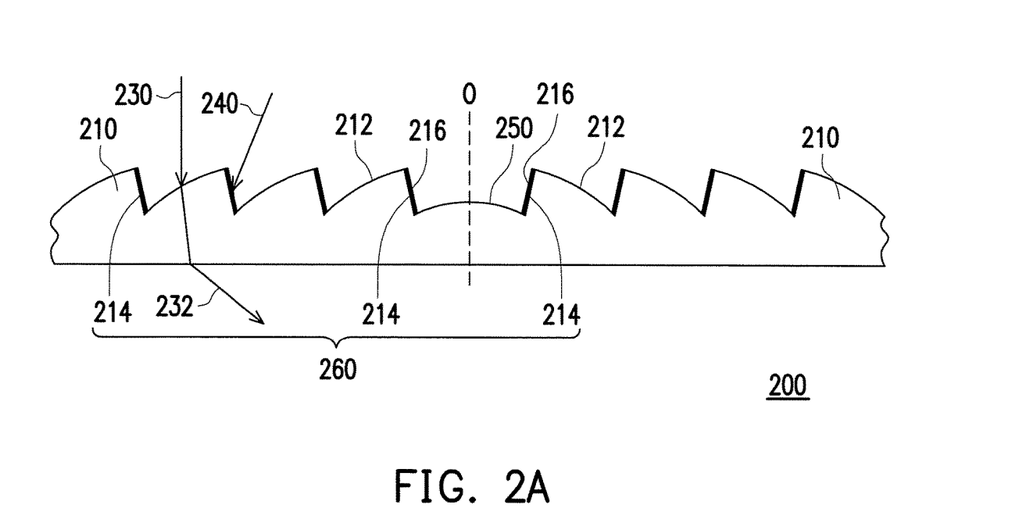
FIG. 2A is a schematic cross-sectional view of a Fresnel lens of a convex lens type in the optical assembly of the embodiment depicted in FIG. 1A and FIG. 1B.

Referring to FIG. 2A, FIG. 2A is a schematic cross-sectional view of a Fresnel lens 200 of a convex lens type in the optical assembly 110 of the embodiment depicted in FIG. 1A and FIG. 1B. The optical assembly 110 may be composed of one or a plurality of Fresnel lenses, optical lenses with similar function or a combination of the aforementioned optical lenses, which is not limited the invention. In the present embodiment, the optical assembly 110 includes at least one Fresnel lens 200. For instance, a microstructure surface 250 of the Fresnel lens 200 of the optical assembly 110 may face away from the user's eyes 130 and face the display 120. In the present embodiment, the surface 250 of the Fresnel lens 200 has a sawtooth-shaped microstructure with a plurality of ring teeth 210, where a side surface of each ring tooth 210 is an optical effective side surface 212 for optical imaging, and the other side surface is a non-optical effective side surface 214. In the present embodiment, the non-optical effective side surface 214 of each ring tooth 210 of the Fresnel lens 200 is coated with a light absorbing material 216. Light 230 entering the optical effective side surface 212 is refracted by the Fresnel lens 200 to pass through the optical assembly 110 to become light 232. On the other hand, light 240 incident on the non-optical effective side surface 214 is absorbed by the light absorbing material 216 and is incapable of passing through the optical assembly 110. Namely, in the present embodiment, the non-optical effective side surfaces 214 of the Fresnel lens 200 form a non-optical effective area 260, and the non-optical effective area 260 of the Fresnel lens 200 is coated with the light absorbing material 216.

The light absorbing material 216 is, for example, a black ink, a resin doped with black toner or other adaptive materials. However, the type or the coating manner of the light absorbing material 216 is not limited in the invention and can be adaptively selected by persons with ordinary skilled in the art according to actual application scenarios.

Figure 2B:
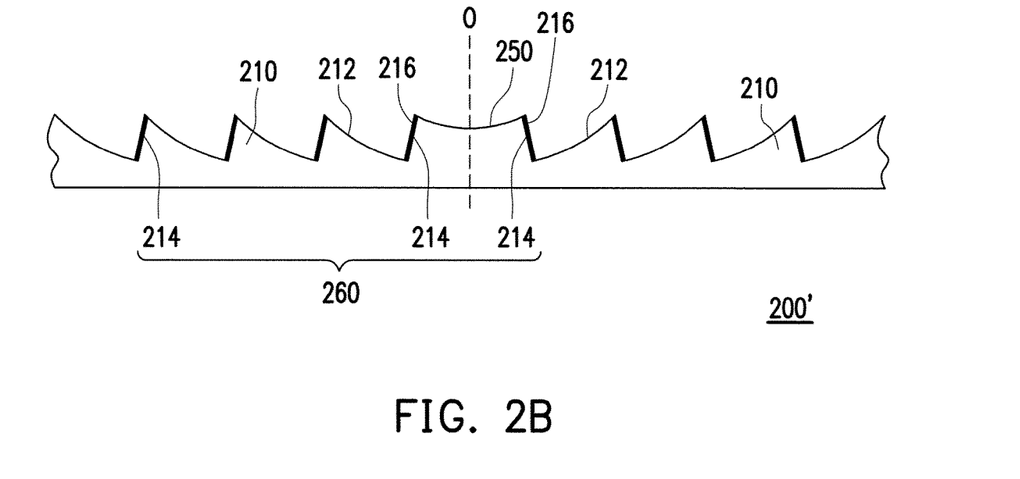
FIG. 2B is a schematic cross-sectional view of a Fresnel lens of a concave lens type according to another embodiment of the invention.

In particular, the Fresnel lens of the present embodiment may be a convex lens, For example, as illustrated in FIG. 2A, the Fresnel lens 200 is a convex lens having a plurality of ring teeth 210, and the non-optical effective side surface 214 of each ring tooth 210 of the Fresnel lens 200 belongs to the non-optical effective area 260, where the non-optical effective side surface 214 is an inner side surface of the ring teeth 210 adjacent to an optical axis O of the Fresnel lens 200. FIG. 2B is a schematic cross-sectional view of a Fresnel lens of a concave lens type according to another embodiment of the invention. In another embodiment of the invention, the Fresnel lens may also be a concave lens. For example, as illustrated in FIG. 2B, a Fresnel lens 200' is a concave lens having a plurality of ring teeth 210, a non-optical effective side surface 214 of each ring tooth 210 of the Fresnel lens 200' belongs to the non-optical effective area 260, where the non-optical effective side surface 214 is an outer side surface of the ring teeth 210 far away from the optical axis O of the Fresnel lens 200'. The type of the Fresnel lens is not particularly limited in the invention.

Thus, in the present embodiment, by coating the light absorbing material 216 on the non-optical effective area of the Fresnel lens 260, the light can be blocked from passing through the optical assembly 110 from the non-optical effective area, so as to improve the issue of stray light to enhance viewing quality of the virtual reality.

It should be specially mentioned that, in other embodiments, the Fresnel lens of the optical assembly 110 of the embodiment above may also be selected not to be coated with the light absorbing material, or alternatively, in other embodiments, the Fresnel lens may selected to be coated with the light absorbing material, but the tilt angle of the optical assembly 110 and the display 120 is 0 degree. Any person with ordinary skills in the art may adaptively change or modify the embodiments described above or the structures illustrated in the drawings based on demands, which is not limited in the invention.

Referring to FIG. 1A and FIG. 1B again, in an embodiment, the virtual reality display apparatus 100 further includes a distance adjuster 160 connected with the optical assembly 110 and the display 120. The distance adjuster 160 is configured to adjust a distance between the optical assembly 110 and the display 120. The distance adjuster 160 may include a gear or other mechanical elements (e.g., a rack, a slide, a screw, a spring and so on, a combination of the aforementioned elements or a combination of other adaptive mechanical elements) used by the distance adjuster. In addition, the disposition position of the distance adjuster 160 depicted in the embodiment of the invention is only exemplarily illustrated, and any person with ordinary skill in the art may adaptively change it based on demands, and the invention is not limited thereto.

In particular, referring to FIG. 1B, a spacing between the display 120L and the optical assembly 110L on the transmission path of the image beam 140L to the user's left eye 130L is SP1, and an a spacing between the display 120R and the optical assembly 110R on the transmission path of the image beam 140R to the user's right eye 130R is SP2. For instance, SP1 may refer to a spacing between the display 120L and the optical assembly 110L along the optical axis of the optical assembly 110L, and SP2 may refer to a spacing between the display 120R and the optical assembly 110R along the optical axis of the optical assembly 110R. The measurement of the distance between the optical assembly 110 and the display 120 is not limited in the invention.

In the embodiment illustrated in FIG. 1B, the distance adjuster 160 may respectively adjust the spacing SP1 between the display 120L and the optical assembly 110L and the spacing SP2 between the display 120R and the optical assembly 110R, and imaging distances of the optical assemblies 110L and 110R may be respectively adjusted by changing the spacings SP1 and SP2. For example, the distance adjuster 160 may adjust the imaging distances according to eyesight conditions of the user's left and right eyes 130L and 130R, so as to adapt to a user with different eyesights of two eyes.

Figure 3:
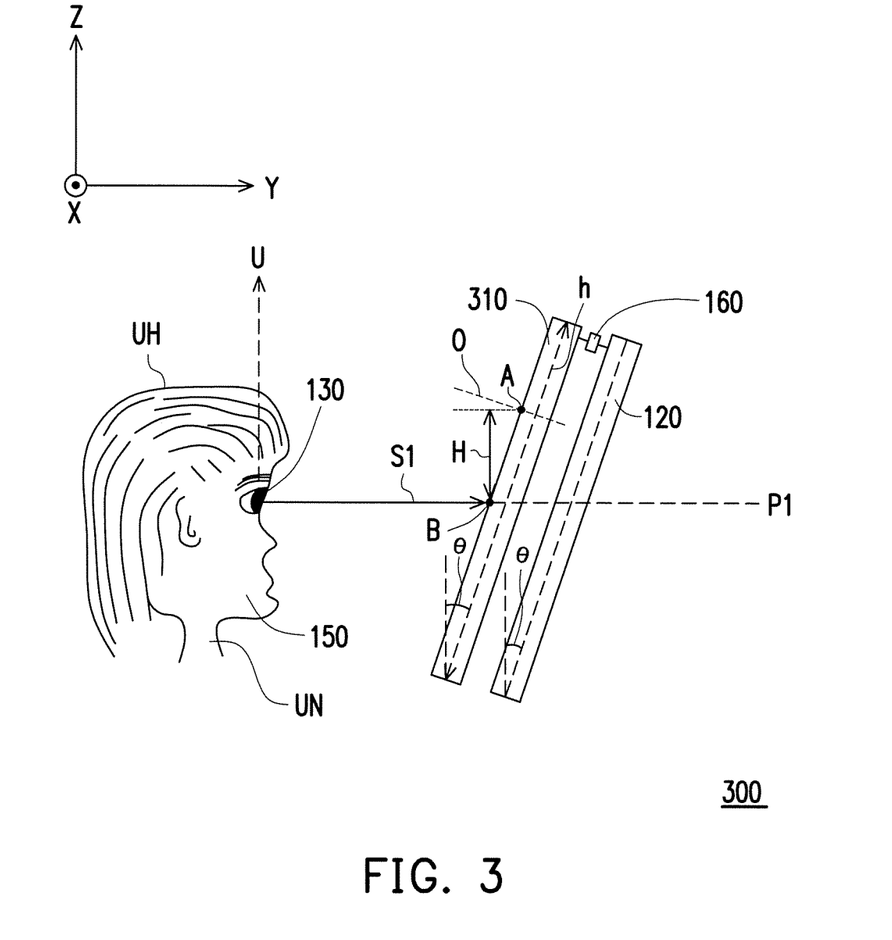
FIG. 3 is a schematic side view of a virtual reality display apparatus according to another embodiment of the invention.

FIG. 3 is a schematic side view of a virtual reality display apparatus according to another embodiment of the invention. Referring to FIG. 3, a virtual reality display apparatus 300 of the present embodiment is similar to the virtual reality display apparatus 100 of the embodiment illustrated in FIG. 1A and FIG. 1B, though the main difference between the two embodiments lies in, for example, an optical center A of an optical assembly 310 of the virtual reality display apparatus 300 decentering in the upward direction U with respect to an intersection point B of the user's sight line S1 in a front direction. The front direction is, for example, the positive Y-axial direction.

In the present embodiment, the user's sight line S1 in the front direction is included in the horizontal sight line plane P1, and a position at which the sight line S1 is projected on a surface of the optical assembly 310 is the intersection point B, while the optical center A of the optical assembly 310 is a position at which the optical axis O of the optical assembly 310 passes through the surface of the optical assembly 310 facing the eyes 130. The intersection point B and the optical center A have an eccentric distance H between each other in the upward direction U (e.g., the positive Z-axial direction) or a downward direction (e.g., the negative Z-axial direction) opposite to the upward direction U. In the present embodiment, the eccentric distance H is, for example, greater than 0 mm and smaller than or equal to 10% of a height h of the optical assembly 310, where the height h is a width of the optical assembly 310 which is adjacent to the upward direction U and perpendicular to the optical axis O. In detail, the intersection point B may shift upward or downward with respect to the optical center A, and a rage of the shift is within 10% of the height h.

For instance, when the optical center A of the optical assembly 310 decenters upward, i.e., the optical center A is higher than the intersection point B in the upward direction U, as illustrated in FIG. 3, and thus, an image clarity of the lower field of view $\beta$ is increased. By contrast, when the optical center A of the optical assembly 310 decenters downward, i.e., the optical center A is lower than the intersection point B in the upward direction U, an image clarity of the upper field of view $\alpha$ is increased. Thus, in the present embodiment, with the optical center A of the optical assembly 310 decentering with respect to the intersection point B of the user's sight line in the front direction, a clear range of the image may be moved within a range of a 3D view angle, so as to increase an image clarity within the 3D view angle. The image clarities of the upper and the lower fields of view may be changed according to the decentering relation between the optical center A of the optical assembly 310 and the intersection point B.

Figure 4:
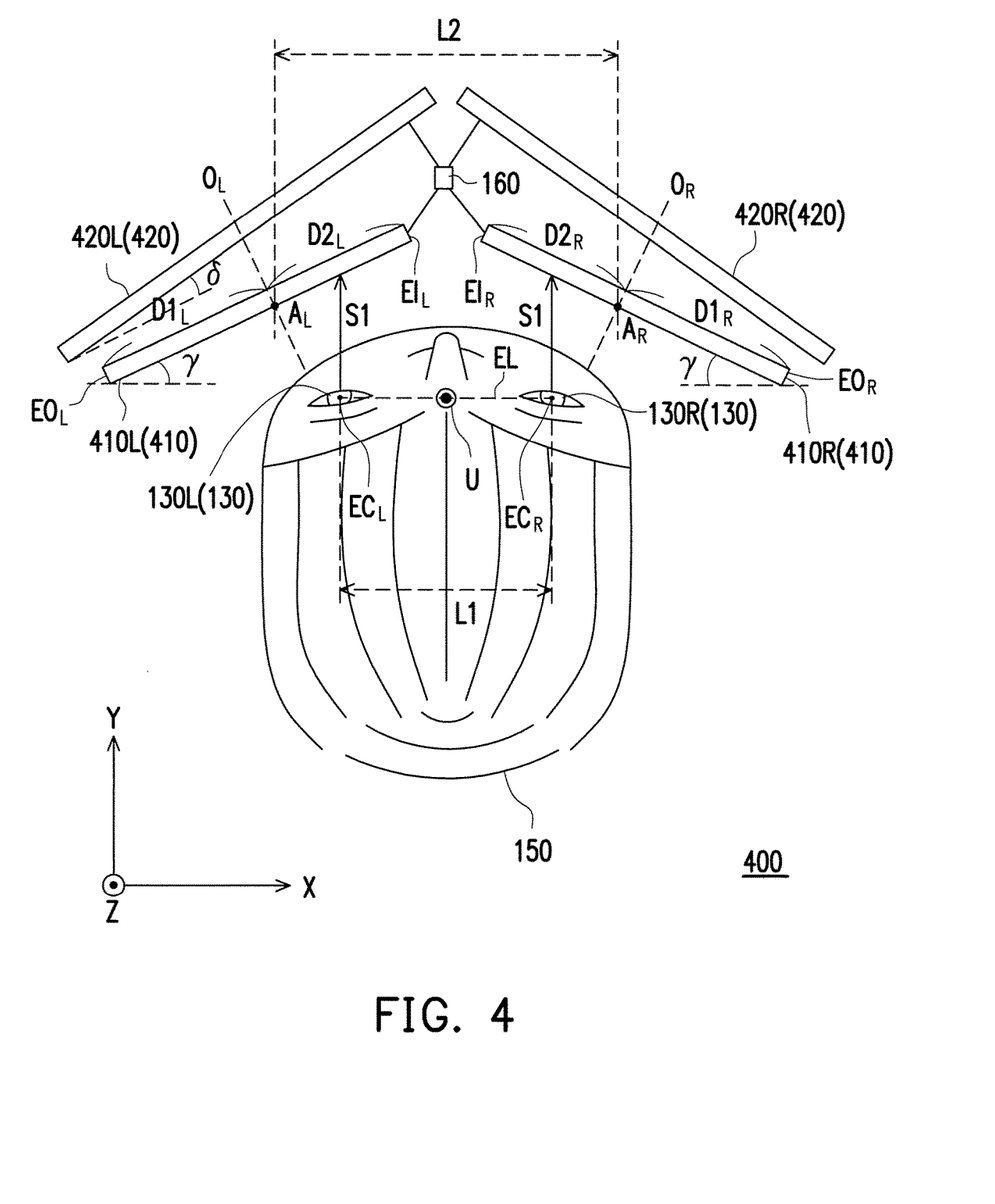
FIG. 4 is a schematic top view of a virtual reality display apparatus according to another embodiment of the invention.

FIG. 4 is a schematic top view of a virtual reality display apparatus according to another embodiment of the invention. Referring to FIG. 4, a virtual reality display apparatus 400 of the present embodiment is similar to the virtual reality display apparatus 100 of the embodiment illustrated in FIG. 1A and FIG. 1B or the virtual reality display apparatus 300 of the embodiment illustrated in FIG. 3, though the main difference lies in, for example, an optical assembly 410 and a display 420 of the virtual reality display apparatus 400 being obliquely disposed with respect to a connection line EL connecting user's two eyes. For example, the optical assembly 410 and the display 420 are no longer parallel to the connection line EL, i.e., the optical assembly 410 and the display 420 are no longer parallel to the X axis.

In particular, the optical assembly 410 has an included angle γ relative to the connection line EL, where the included angle γ is an acute angle, and a range of the included angle γ is greater than 0 degree and is smaller than or equal to 45 degrees, for example. When the included angle γ is 0 degree, i.e., the optical assembly 410 is disposed parallel to the connection line EL (i.e., parallel to the X axis), the user may obtain a preferable 3D effect. However, a full range of a viewable angle of the user on the XY plane is usually less sufficient than a human full field of view, i.e., smaller than 180 degrees. In the present embodiment, the optical assembly 410 which is obliquely disposed has an included angle γ with respect to the connection line EL to expand the user's field of view on the horizontal sight line plane P1, so as to increase the range of the user's horizontal field of view in the condition that the 3D visual effect is maintained.

It should be noted that in the embodiment illustrated in FIG. 4, the optical assembly 410 may not be disposed parallel to the display 420. For example, a projection of the optical assembly 410 on the XY plane has a deviation angle δ with respect to a projection of the display 420 on the XY plane, where the deviation angle δ is an acute angle. A range of the deviation angle δ may be greater than or equal to 0 degree and is smaller than 15 degrees. In other embodiments, the optical assembly 410 may be disposed parallel to the display 420, but the invention is not limited thereto. In the present embodiment, with the optical assembly 410 having the deviation angle δ with respect to the display 420, field curvature aberration may be fixed.

In the present embodiment, a spacing L2 between an optical center $A_L$ corresponding to a left-eye optical assembly 410L and an optical center $A_R$ corresponding to a right-eye optical assembly 410R is greater than a spacing L1 between the user's two eyes. The spacing L1 between the user's two eyes is, for example, a spacing between a rotation center of the user's left eye $EC_L$ and a rotation center of the user's right eye $EC_R$ along the eyes connection line EL. In the embodiment illustrated in FIG. 4, L2>L1 represents that the optical assembly 410 decenters toward the outside, where the outside refers to, for example, a direction pointing to the user's temple. In other words, the sight line S1 in front of the user's eyes does not intersect the optical center $A_L$ or $A_R$ of the optical assembly 410.

In the present embodiment, the optical center of the optical assembly 410 may not coincide with the geometric center thereof. Thus, in case the optical assembly 410 employs the optical center as a reference point, widths of its left and right sides may be unequal. For example, a distance from the optical center $A_R$ of the optical assembly 410R to an end $EO_R$ of the optical assembly 410R adjacent to one of the user's temple is $D1_R$, and a distance from the optical center $A_R$ to an end $EI_R$ of the optical assembly 410R adjacent to the user's nose is $D2_R$, where $D1_R>D2_R$. For example, a distance from the optical center $A_L$ of the optical assembly 410L to an end $EO_L$ of the optical assembly 410L adjacent to the other one of the user's temples is $D1_L$, and a distance from the optical center $A_L$ to an end $EI_L$ of the optical assembly 410L adjacent to the user's nose is $D2_L$, where $D1_L>D2_L$.

In the present embodiment, with the optical assembly 410 disposed as decentering toward the outside, field curvature aberration in the central field of view may be reduced to increase the image clarity.

It should be specially mentioned that in the present embodiment, the display 420 and the optical assembly 410 of the virtual reality display apparatus 400 may respectively have the tilt angle θ relative to the upward direction U, the optical assembly 410 may also include at least one Fresnel lens with its non-optical effective area coated with the light absorbing material, and the optical assembly 410 and the display 420 may be obliquely disposed with respect to the user's eyes connection line EL, or the optical assembly 410 may not be disposed parallel to the display 420, which is not limited in the invention.

In view of the foregoing, in the virtual reality display apparatus provided by the embodiments of the invention, as the display and the optical assembly respectively have the tilt angle relative to the upward direction, the user's vertical field of view can be expanded accordingly. In addition, the optical assembly of the embodiments of the invention includes at least one Fresnel lens with its non-optical effective area coated with the light absorbing material. As the non-optical effective area of the Fresnel lens is coated with the light absorbing material, the light can be blocked from passing through the optical assembly from the non-optical effective area, so as to improve the issue of stray light to enhance viewing quality of the virtual reality.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. A virtual reality display apparatus, comprising:
   at least one display, configured to provide an image beam to a user's left eye or right eye; and
   at least one optical assembly, disposed on a transmission path of the image beam and comprising at least one Fresnel lens, wherein each of the display and the optical assembly respectively has a tilt angle relative to an upward direction, the upward direction is a direction perpendicular to the user's horizontal sight line plane and defined as a direction pointing from the user's neck to the top of the user's head, and a range of the tilt angle is greater than 0 degree and is smaller than or equal to 20 degrees, and wherein a position of the user's front sight line projected on a surface of the optical assembly has an eccentric distance from an optical center of the optical assembly in the upward direction or a downward direction opposite to the upward direction, and the eccentric distance is greater than 0 mm and is smaller than or equal to 10% of a height of the optical assembly, wherein the optical center is a position at which an optical axis of the optical assembly passing through the optical assembly, and the height is a width of the optical assembly which is adjacent to the upward direction and perpendicular to the optical axis.

2. The virtual reality display apparatus according to claim 1, wherein the optical assembly has an included angle with respect to a connection line connecting the user's two eyes, and a range of the included angle is greater than 0 degree and is smaller than or equal to 45 degrees.

3. The virtual reality display apparatus according to claim 2, wherein the at least one optical assembly comprises two optical assemblies, wherein a distance between an optical center of the optical assembly corresponding to the user's left eye and an optical center of the optical assembly corresponding to the user's right eye is greater than a distance between a rotation center of the user's left eye and a rotation center of the user's right eye.

4. The virtual reality display apparatus according to claim 3, wherein a distance from the optical center of each optical assembly to an end of the optical assembly adjacent to the user's temple is D1, and a distance from the optical center of each optical assembly to an end of the optical assembly adjacent to the user's nose is D2, wherein D1>D2.

5. The virtual reality display apparatus according to claim 1, further comprising a distance adjuster, the at least one optical assembly comprising two optical assemblies, and the at least one display comprising two displays, wherein the distance adjuster is configured to respectively adjust a spacing between the display and the optical assembly on the transmission path of the image beam to the user's left eye and a spacing between the display and the optical assembly on the transmission path of the image beam to the user's right eye.

6. The virtual reality display apparatus according to claim 5, wherein the distance adjuster comprises a gear, a rack, a slide, a screw, a spring or a combination thereof.

7. The virtual reality display apparatus according to claim 1, wherein a non-optical effective side surface of each ring tooth of the Fresnel lens is coated with a light absorbing material.

8. The virtual reality display apparatus according to claim 7, wherein the Fresnel lens is a convex lens, and the non-optical effective side surface of each ring tooth of the Fresnel lens is an inner side surface of the ring teeth which is adjacent to an optical axis of the Fresnel lens.

9. The virtual reality display apparatus according to claim 7, wherein the Fresnel lens is a concave lens, and the non-optical effective side surface of each ring tooth of the Fresnel lens is an outer side surface which is far away from an optical axis of the Fresnel lens.

10. A virtual reality display apparatus, comprising:
at least one display, configured to provide an image beam to a user's left eye or right eye; and
at least one optical assembly, disposed on a transmission path of the image beam and comprising at least one Fresnel lens, wherein a non-optical effective area of the Fresnel lens is coated with a light absorbing material, and wherein a position of the user's front sight line projected on a surface of the optical assembly has an eccentric distance from an optical center of the optical assembly in an upward direction or a downward direction opposite to the upward direction, and the eccentric distance is greater than 0 mm and is smaller than or equal to 10% of a height of the optical assembly, wherein the optical center is a position at which an optical axis of the optical assembly passing through the optical assembly, the upward direction is a direction perpendicular to the user's horizontal sight line plane and defined as a direction pointing from the user's neck to the top of the user's head, and the height is a width of the optical assembly which is adjacent to the upward direction and perpendicular to the optical axis.

11. The virtual reality display apparatus according to claim 10, wherein the optical assembly has an included angle with respect to a connection line connecting the user's two eyes, and a range of the included angle is greater than 0 degree and is smaller than or equal to 45 degrees.

12. The virtual reality display apparatus according to claim 11, wherein the at least one optical assembly comprises two optical assemblies, wherein a distance between an optical center of the optical assembly corresponding to the user's left eye and an optical center of the optical assembly corresponding to the user's right eye is greater than a distance between a rotation center of the user's left eye and a rotation center of the user's right eye.

13. The virtual reality display apparatus according to claim 12, wherein a distance from the optical center of each optical assembly to an end of the optical assembly adjacent to the user's temple is D1, and a distance from the optical center of each optical assembly to an end of the optical assembly adjacent to the user's nose is D2, wherein D1>D2.

14. The virtual reality display apparatus according to claim 10, further comprising a distance adjuster, the at least one optical assembly comprising two optical assemblies, and the at least one display comprising two displays, wherein the distance adjuster is configured to respectively adjust a spacing between the display and the optical assembly on the transmission path of the image beam to the user's left eye and a spacing between the display and the optical assembly on the transmission path of the image beam to the user's right eye.

15. The virtual reality display apparatus according to claim 14, wherein the distance adjuster comprises a gear, a rack, a slide, a screw, a spring or a combination thereof.

16. The virtual reality display apparatus according to claim 10, wherein the Fresnel lens is a convex lens, and a non-optical effective side surface of each ring tooth of the Fresnel lens belongs to the non-optical effective area, wherein the non-optical effective side surface is an inner side surface of the ring teeth which is adjacent to an optical axis of the Fresnel lens.

17. The virtual reality display apparatus according to claim 10, wherein the Fresnel lens is a concave lens, and a non-optical effective side surface of each ring tooth of the Fresnel lens belongs to the non-optical effective area, wherein the non-optical effective side surface is an outer side surface of the ring teeth which is far away from an optical axis of the Fresnel lens.

* * * * *